UNITED STATES PATENT OFFICE.

GEORGE W. YEOMAN, OF ST. PAUL, MINNESOTA.

METHOD OF FLAVORING BUTTER.

983,854.  Specification of Letters Patent.  Patented Feb. 7, 1911.

No Drawing.  Application filed January 6, 1910. Serial No. 536,704.

*To all whom it may concern:*

Be it known that I, GEORGE W. YEOMAN, a citizen of the United States, residing at St. Paul, in the county of Ramsey and State of Minnesota, have invented a new and useful Improvement in the Method of Flavoring Butter, of which the following is a specification.

My invention is designed for the production of an improved article of manufacture consisting of butter substantially free from foreign flavors and germs and the invention resides in a novel process of producing the butter and in the improved product obtained as a result thereof.

More particularly this invention has to do with an improved flavor for butter which also contains the aroma giving principle.

I admit that prior to this, butter has been flavored and given aroma by the use of what is known as starter which name is applied to a culture of bacteria usually supposed to contain lactic-acid-forming bacteria in predominance and from which all other bacteria, as far as possible, are excluded. I further admit that the use of said starter accomplishes the result of flavoring the butter with a variable and unstable flavor. The variableness is due to the presence of more or less of the undesirable bacteria and improper control of temperatures during propagation and the instability is due to the presence in the butter of the bacteria of the starter which go on developing and finally develop bad flavors. I also admit that the use of starter gives aroma varying from almost none at all, to aroma of a fair strength. I claim, however, that nothing is known of what the aroma is due to and that its development can not be controlled or forced in the present state of knowledge concerning it. I claim that the flavor in butter is due principally to lactic acid and that the aroma is due to the presence of alcohol. Alcoholic fermentation takes place simultaneously with the lactic fermentation with the resulting formation of ethyl alcohol and probably some amyl alcohol.

My invention then consists of the use of a mixture of lactic acid and alcohol (such as ethyl or amyl alcohol) to produce flavor and aroma in butter. I claim that alcohol has never been used in commercial form to produce aroma and that a mixture of alcohol and lactic acid both in commercial form has never been used to produce flavor and aroma, at the same time. I claim that this method of giving the butter the necessary flavor and aroma, without the introduction of bacteria into the butter as is done in the case of starter, makes the butter a more healthful food. The starter is a culture of bacteria and furnishes a good breeding place for disease germs which may get in through carelessness or in spite of care. In case of starter, these are introduced into the butter along with the media in which they grew and which continues to maintain them.

Two ounces of lactic acid and one ounce of ethyl alcohol is sufficient for from eight hundred to one thousand pounds of butter. The method of use is as follows:—The cream is churned, the buttermilk is drawn off and the butter washed. Then a trench is dug in the butter and the three ounces of the mixture (two ounces lactic acid and one ounce alcohol) is mixed with approximately one gallon of whole milk, skim-milk, cream or buttermilk, preferably skim-milk and the whole mixture poured into the trench. The trench is then sealed over the top with butter so that the mixture of milk and flavor is in the butter. The mixture is then worked into the butter such as by giving the churn two to four revolutions in the working gear.

This method eliminates the use of such a large amount of milk as is used in starter, takes only a fraction of a minute to prepare and is hence much cheaper. It produces a uniform flavor which the starter does not. It does not fill the butter with bacteria as the starter does. Therefore the cream may be pasteurized, the wash water pasteurized, the gallon of milk or other medium with which the flavor is mixed may be pasteurized and since the flavor can contain no bacteria, a sterile butter may thus be produced which has no disease germs and which has vastly improved keeping qualities.

In accordance with the patent statutes, I have described my improved process and the product of said process which I consider to represent the best embodiment of my invention but I desire to have it understood that the steps of the process set forth and the product thereof may be modified within the scope of the following claims without departing from the principles which I have applied.

Having described my invention what I claim as new and desire to protect by Letters Patent is:—

1. The process of making butter which consists in churning cream and separating the butter-milk from the butter and then working alcohol and lactic acid into said butter.

2. The process of making butter which consists in churning cream and separating the butter-milk from the butter and then working alcohol and lactic acid into said butter; the proportion used being approximately eight hundred to one thousand pounds of butter, two ounces of lactic acid and one ounce of alcohol.

In testimony whereof, I have signed my name to this specification, in the presence of two subscribing witnesses.

GEORGE W. YEOMAN.

Witnesses:
H. L. FISCHER,
F. G. BRADBURY.